May 24, 1966 H. A. EHRENFREUND 3,252,228
EXPANDER FOR POLYMERIC MATERIAL
Filed April 23, 1962 3 Sheets-Sheet 1

INVENTOR.
Herbert A. Ehrenfreund
BY Chapin & Neal
Attorneys

May 24, 1966  H. A. EHRENFREUND  3,252,228
EXPANDER FOR POLYMERIC MATERIAL
Filed April 23, 1962  3 Sheets-Sheet 2
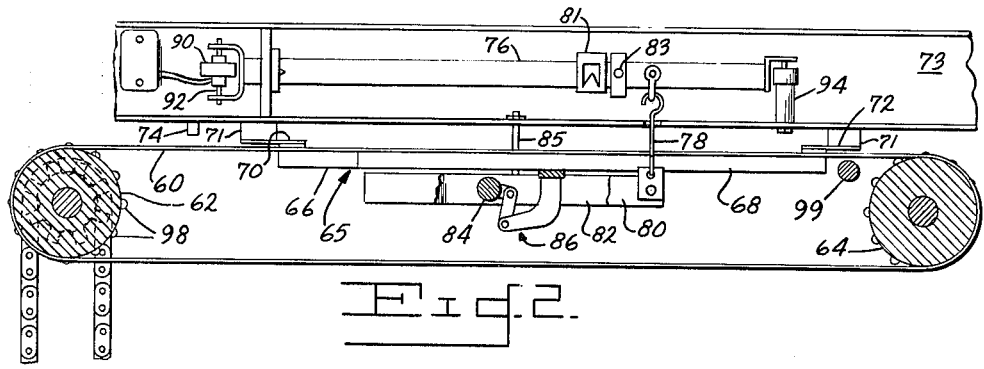
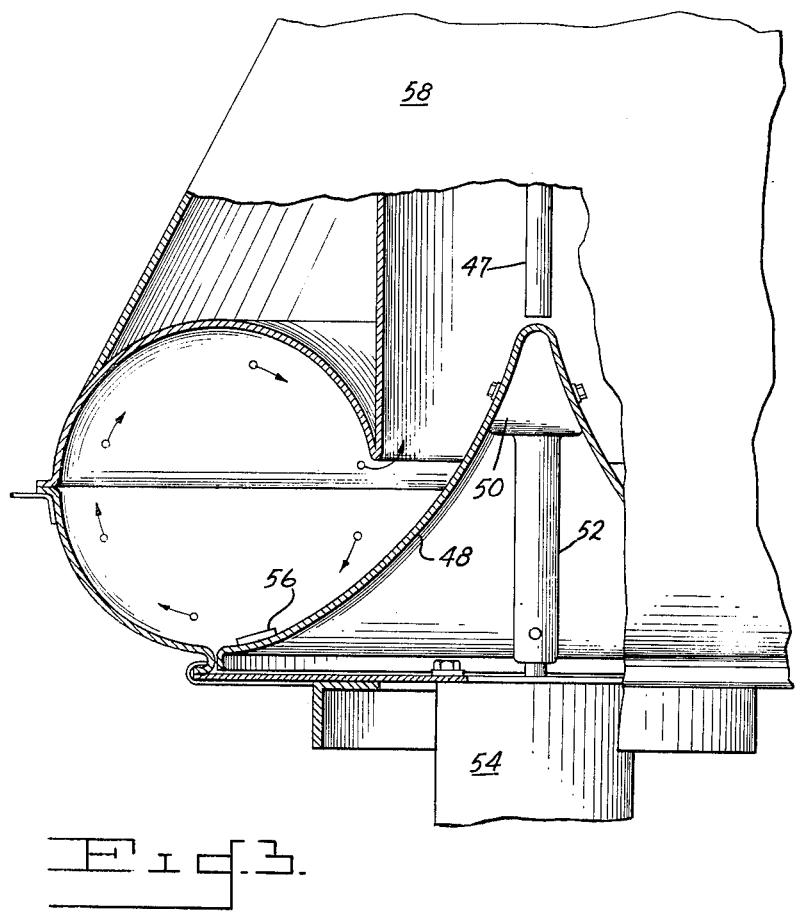
INVENTOR.
Herbert A. Ehrenfreund
BY Chapin & Neal
Attorneys

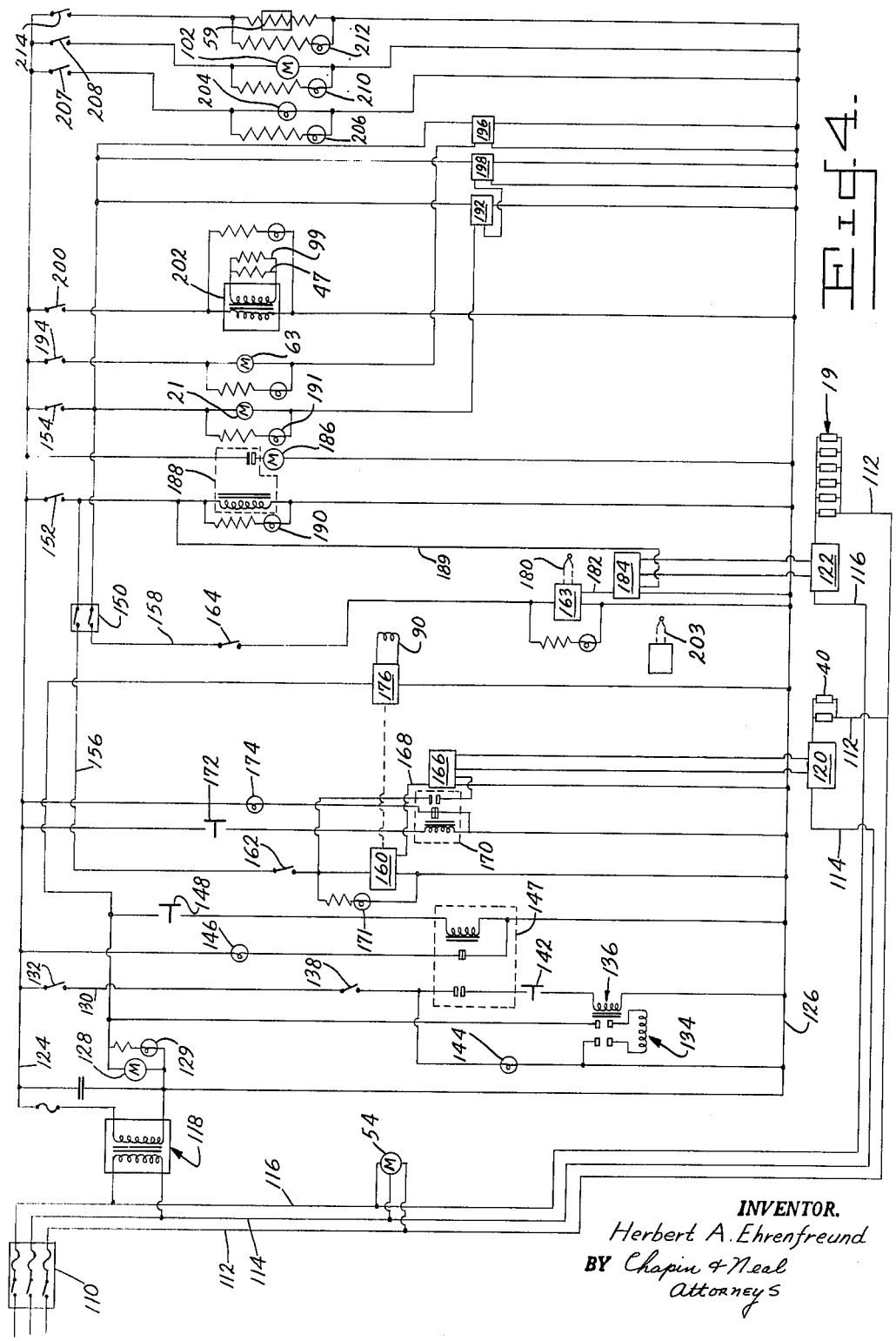

United States Patent Office 3,252,228
Patented May 24, 1966

3,252,228
EXPANDER FOR POLYMERIC MATERIAL
Herbert A. Ehrenfreund, Longmeadow, Mass., assignor to The Lodge & Shipley Company, Cincinnati, Ohio, a corporation of Ohio
Filed Apr. 23, 1962, Ser. No. 191,669
5 Claims. (Cl. 34—57)

This is a continuation-in-part of my earlier application Serial No. 168,408, filed January 24, 1962, now abandoned.

This invention relates to the expansion of thermoplastic particles, and more particularly to improved means for expanding such particles. One important aspect of this invention is the preliminary treatment of moldable expandable thermoplastic particles prior to molding, another pertains to the expansion of thermoplastic particles adapted for various other uses, such for example as strands used in loose fill packaging.

It is conventional practice in molding foamable or expandable thermoplastic particles or "beads" such as polystyrene, polyvinyl chloride and the like, to partially or incompletely expand the beads before introducing them into a mold. Pre-expansion permits molding to be carried out at lower mold pressures and results in a substantially faster molding cycle.

Commercially available expandable polymeric particles contain suitable organic volatile liquid blowing or raising agents such as pentane, hexane and the like. In conventional processes, polymeric particles are partially expanded by heating for a predetermined length of time so only a portion of the blowing agent evaporates. The pre-expansion is conventionally carried out in hot water or steam. After pre-expansion, the beads must be dried for a considerable length of time, on the order of 24 hours, before they can be properly used in the mold. Failure to dry the beads results in irregular expansion during molding, known as "thermal shock." Thermal shock is caused by the moisture on the beads which must be evaporated before the bead temperature can be substantially increased. During molding, as soon as the moisture layer is evaporated, the bead temperature rises too sharply, with the result that many of the beads are crushed or damaged.

While one important advantage of this invention is the dry partial expansion of moldable particles, whatever the utility of expanded polymeric material it has been found that the use of moisture in expanding the particles is undesirable because the material cannot be used immediately for its intended purpose since surface moisture must be removed. This usually requires a drying time of about 24 hours and calls for provision of substantial storage facilities.

Conventional mechanical handling of expandable polymeric material tends to damage or dent the particles, making uniform particle size and density difficult of attainment. Moreover, this particle damage usually requires wasteful additional expansion to achieve the final desired bulk density, which substantially reduces the quantity of residual blowing agent for the molding operation.

Another drawback of conventional steam pre-expansion is the difficulty encountered in providing an efficient and accurate density control technique, since it is necessary to dry a volumetric sample of the beads before weighing for density.

It is the principal object of this invention to provide an improved apparatus for expanding polymeric material to a selected bulk density depending upon the use to which the material is to be put.

It is another object of this invention to provide an improved means of accurately controlling the bulk density of expandable polymeric beads to a predetermined value suitable for subsequent molding operation.

It is a further object of this invention to provide a machine for automatically and continuously controlling the bulk density of polymeric beads.

It is still another object of this invention to provide a means of expanding polymeric particles which minimizes particle damage and produces particles having a high degree of uniformity as to size and density.

And another object of this invention is to provide a means of expanding foamable thermoplastic particles so as to enable immediate use of the particles without delay for drying.

The above and other objects and advantages of this invention will be more readily apparent from the following description and with reference to the accompanying drawings in which:

FIG. 2 is an elevational view on an enlarged scale of a portion of the machine shown in FIG. 1 and with parts in section;

FIG. 3 is an elevational view on an enlarged scale of a portion of the machine shown in FIG. 1; and FIG. 4 is a schematic wiring diagram of the electrical control system, for controlling operation of the machine embodying this invention.

Figure 1:
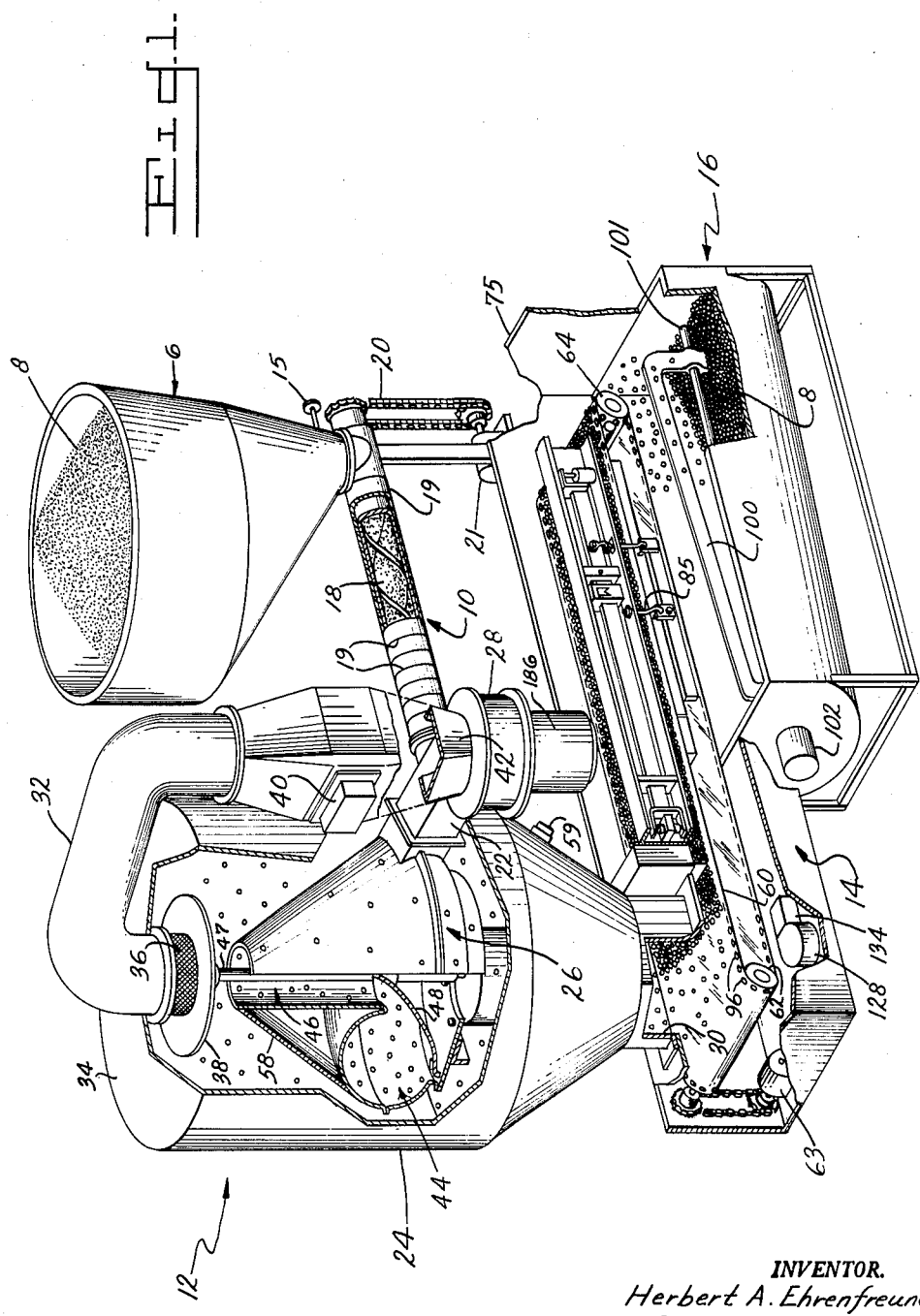
FIG. 1 is a perspective view of a machine embodying this invention.

The raw materials to be expanded, in accordance with this invention, are in the form of particles or granules which contain a blowing agent and have a granular density on the order of 40 lbs. per cubic foot. For molding purposes it is generally desirable to reduce the density to the range of 1 to 3 lbs. per cubic foot. To accomplish proper particle expansion, it has been found that the granules must be heated so that they are soft but not sticky. This is possible because there is a short temperature range in which the thermoplastic softens without complete melt and coalescence.

It has been determined that the expanding of foamable bulk materials is a true time-temperature relationship and in order to obtain uniform bulk density, each of the particles must be removed from the heat source as its density reaches the desired value.

Referring in detail to the drawing, in FIG. 1 is shown an overall view of a machine embodying this invention. As shown, the machine comprises a hopper 6 by which thermoplastic particles or beads, such as shown at 8, are supplied by gravity-feed into a pre-heating chamber 10. From the chamber 10 the beads are introduced into an expansion unit, shown generally at 12, in which the bulk density of the beads is decreased to a predetermined value by entraining the beads in a heated, essentially dry, air current.

As the beads expand attaining a predetermined density, they are disentrained or extracted from the air current and deposited in a density control unit 14. The control unit 14 continuously and automatically compares the bulk density of the bead output from the expansion unit 12 with a pre-set valve computing density error. As a function of the density error, a signal is generated which automatically varies the temperature of the air flowing through the expansion unit, as hereinafter described. In this way it has been found that the density of the beads can be continuously and automatically maintained at a selected value, with a high degree of accuracy. A storage chamber, shown generally at 16, is provided to receive the beads from the control unit and to store them for subsequent use in a molding machine.

The hopper 6 may be any suitable construction and as shown is provided with a valve operable by member 15 for controlling the feed rate of raw beads from the hopper into the pre-heater 10.

As shown, the pre-heater 10 is in the form of an elongated cylindrical conduit in which is disposed a screw type conveyor 18. The conveyor 18 may be driven by any suitable means such as the chain and sprocket arrangement indicated generally at 20, which may be driven by a motor 21. From the hopper 26 to the expansion unit 12, the beads are heated by electrical resistance heaters 19 which surround the cylindrical conduit, generally along its entire length. The heaters are operated at sufficient temperature to raise the temperature of the beads to a point just below the expansion temperature which is about 180° F. for polystyrene beads marketed by the major suppliers. The screw 18 is continuously driven to convey and agitate the beads so as to minimize the tendency of the beads to agglomerate or fuse together in the cylindrical conduit. For expansion of strand type material pre-heating may be dispensed with and the material introduced directly into the expansion unit 12.

From the conduit, the pre-heated beads are introduced into the expansion unit 12 through an air duct 22, which extends through the wall of outer casing 24 and communicates with the interior of an air flow unit 26 disposed within the outer chamber. The periphery of the unit 26 is spaced from the wall of the outer casing to permit the beads free passage therebetween. The outer end of the air duct 22 is connected to the output of a centrifugal fan or impeller 28.

The casing 24 provides means for collecting expanded beads and is provided with an opening 30 at the bottom through which the beads are emitted and deposited in the control unit 14. An air duct 32 extends into the outer casing 24 approximately at the center of the top wall 34. The end of the duct 32 within chamber 24 is provided with a screen 36 to prevent the thermoplastic beads entering the duct and air supply system. An air baffle or deflector plate 38 is located at the bottom of the screen 36. The duct 32 extends from the top of the chamber 24 to an electrical heating unit 40 operated to heat the bead-carrying air to a temperature above 180° F., the expansion temperature of most expandable polystyrene beads. From the heater 40 an air conduit or duct 42 extends to the air impeller 28. The air supply system is completed by the duct 22 which opens into the inner chamber 26. An air flow loop thus originates at the fan 28, through duct 22 into the air flow unit 26 which includes an annular chamber 44 and an upwardly opening stack 46. Sufficient velocity is imparted to the air to maintain the beads in suspension in the air and to carry them around the annular chamber 44 and up the stack when the density has been sufficiently reduced. After rising through the stack the air is deflected outwardly by the plate before being drawn into the conduit 32. The air flow loop is completed through the heater 40 back to the fan 28.

The unit 26 includes the annular or toroidal-shaped chamber 44 which is generally circular in cross section. The stack 46 is disposed coaxially of the annular chamber 44 and its lower end communicates with the inner radial portion thereof. The stack provides a vent or path for rising heated air coming from horizontal chamber 44. A destaticizing rod 47 depends from plate 38 along the axis of the stack and is electrically charged to neutralize electrical charges carried by the beads. The upper end of the stack 46 terminates in spaced relation below the air deflector plate 38. The lower inner wall portion of the annular chamber is in the form of a concavely curved, conical member 48. The conical member is secured to a hub 50 (FIG. 3) carried on the end of a shaft 52 driven by a motor 54 in the direction of the air flow in the annular chamber. Adjacent the lower edge of the rotating conical member are a plurality of circumferentially spaced vanes 56 which serve to impart to the air flowing in the annular chamber a rotational component which is generally perpendicular to the main flow whereby the resultant flow follows a helical type path around the inner surface of the annular chamber, such as indicated by the arrows in FIG. 3. The air flow unit 26 is provided with a conical skirt 58 which flares outwardly and downwardly from the top of the stack 46 to the periphery of the annular chamber 44. The skirt 58 insures all expanded beads will be deposited in the control unit 14. A vibrator 59 is provided on the casing 24 to minimize the incidence of beads adhering to the walls of the system.

The annular chamber 44 serves to provide an endless horizontal path in which the polymeric beads may be entrained in a heated, essentially dry current of air, and with the beads discretely held in suspension. The air current generated by the fan 28 moves in an annular path about a vertical axis. The vanes 56 impart to the air current a rotation or agitation such as indicated by the arrows in FIG. 3. The beads derive heat for expansion for the air in which they are suspended in spaced relation whereby there is little incidence of bead damage as in a batch process. When the air-entrained beads have reached a predetermined density, they will be carried by the rising air current which passes upwardly in the stack 46. The beads are air suspended in the rising hot air current in the stack 46 until their density reaches a pre-set value. As the density of each plastic bead decreases to the pre-set value, it will be carried out of the stack and extracted or disentrained from the air flow. Extraction of the expanded beads is accomplished by deflection of the air current outwardly of the stack 46 sufficient to enable gravity to overcome the carrying capacity of the air flow. Thus the beads will fall downwardly about the outer surface of the air flow unit 26 and be deposited in the control unit 14.

The density control unit 14 comprises a conveyor in the form of an endless belt 60 disposed around a pair of spaced rolls 62 and 64. As shown, the roll 62 is driven by motor 63 so that the upper span of the conveyor belt moves toward roll 64 traversing a weighing scale for continuously and automatically weighing a given volume of bead product received from the expansion unit.

The weighing unit may be any suitable type such as a Builders Iron Foundry (B.I.F.) scale which, as shown in FIG. 2, comprises a table 65 having two portions 66 and 68 supported in cantilever fashion at their opposite ends by flexible, spring metal hinge members 70 and 72 respectively. The springs are supported by means of blocks 71 affixed to the underside of an I-beam 73. The I-beam is mounted on the housing 75 of the control unit 14. A vertically adjustable doctor bar 74 is provided for leveling and controlling the height of beads to be carried by the conveyor belt 60 over the upper surface of the table 65. Thus, for a given setting of the doctor bar relative to the upper surface of the conveyor belt, a predetermined volume of beads will be weighed. Any deviation from a pre-set weight, will be indicative of a density variation and result in movement of the table portions 66 and 68.

Movement of the table is transmitted to a balance scale beam 75 by a link 78, the upper end of which is connected to the beam, the other end of which is connected to a bar member 80. A slidable weight 81 is provided on the beam 76 on the opposite side of the beam fulcrum 83. In operation of the unit, the weight 81 is positioned a "set point," a predetermined distance from the fulcrum in accordance with a predetermined scale so that any deviation of the given density will cause the beam 76 to tilt about its fulcrum 83. When the density of the beads is in conformity with the "set point," beam 76 will be balanced.

The bar 80 and another similar bar 82 are spaced below and adjacent the outer side edges of the weighing table. The bars 80 and 82 are interconnected by a cross bar 84 and are supported for vertical pivotable movement intermediate the cross bar 84 and the link 78, by hooks 85. With the arrangement described above and as viewed in FIG. 2, downward table movement about the hinge members 70 and 72 is translated by linkage 86 into clockwise rotation of the rod 84, while, of course, upward movement results in counterclockwise rotation of shaft 84. Since the rod 84 is affixed to the bars 80 and 82, the bars are tilted about their pivot points whereby the link 78 is displaced vertically either upwardly or downwardly, depending on whether the bulk density of the beads is greater or smaller than a pre-set value. For example, when the density of the bead product is too large, the table would move down causing clockwise rotation of rod 84 and consequent clockwise tilting of bars 80 and 82. This, of course, displaces link 78 downward tilting the beam 76 clockwise about its fulcrum 83. Too low bead density would result in opposite rotation of beam 76.

On one end of the beam 76 is an electrical coil 90 in which is disposed a ferromagnetic core 92 carried on the outer end of the beam. The coil is electrically tuned with its core in a predetermined position, when the beam 76 is balanced. Movement of the beam will move the core 92 relative to the turns of the coil causing an electrical signal which, as will be hereinafter described, causes a change in the temperature of the air current in the expansion unit. The opposite end of the beam 76 is provided with a dash pot 94 to smooth the movement and damp oscillations of the beam.

The conveyor belt comprises an endless band of a strong light-weight material such as "Mylar." Along its edge the band is provided with a series of openings 96 (FIG. 1) located and spaced to receive projections 98 extending radially from the rolls 62 and 64. It will be noted that the roll 62 is the driving roll for the conveyor belt so that the upper span of the conveyor is pushed rather than pulled over the upper surface of the weighing table. It has been found that this arrangement results in a greater degree of accuracy. From the discharge end of the conveyor the beads fall into the storage unit 16. A destaticizing rod 99 may be located adjacent the discharge end of the conveyor to remove any static charge carried by the beads before they are deposited into the storage unit.

The storage unit 16 is provided with a beater or agitator 100 to prevent the beads fusing together. As shown, the agitator shaft 101 is rotated by a motor 102. Since the beads are dry they can be used immediately for molding.

In FIG. 4 is shown a wiring diagram of an electrical system for operating and controlling the operation of the pre-expander. As shown, the entire electrical system is powered by 3-phase, 230-volt electrical power connected to a switch and fuse unit 110. From the unit 110 leads 112, 114 and 116 are connected to motor 54 which rotates the cone 48 (FIG. 3). Leads 114 and 116 are also connected to the primary of a step-down transformer 118 which reduces the power to 115 volts, 15 amperes.

Leads 112 and 114 are connected to a saturable reactor 120 of the type manufactured by the West Instrument Co. The air heater 40 is controlled by the reactor 120. Leads 112 and 116 are connected to another saturable reactor 122, similar to the reactor 120, which serves to control the pre-heaters 19. As is well known, a saturable reactor is a magnetic amplifier having D.C. and A.C. windings disposed on a magnetic core. The load is in circuit with the A.C. winding, and the D.C. winding serves as a control winding. When a D.C. signal is received, the voltage across the load increases as a result of the decrease in inductance which is equal to the slope of the hysteresis loop. There is thus an amplifier action whereby a small D.C. signal results in increased voltage to the other components of the system.

The transformer 118 provides, by means of leads 124 and 126, a power supply for the other components of the electrical system. A cabinet fan 128 and its indicator light 129 are connected across the lines 124 and 126 by lead 130 which includes switch 132. A cabinet heater 134 is connected across leads 124 and 126 and is controlled by a relay 136.

To operate the cabinet heater, switch 132 and a heater control switch must both be closed. A normally closed thermostatically operated switch 142 operates to cut the heater "on" and "off" in order to maintain the cabinet of the control unit 14 at a constant temperature. The heater 134 and fan 128 may be located in any suitable position such as shown in FIG. 1 for maintaining constant atmospheric conditions within the cabinet of the control unit. A lamp 144 preferably green, is provided to indicate that the heater is in operation and the lamp 146, preferably red, is provided to indicate the "off" condition of the cabinet heater. An overheat relay 147 is operated by a normally closed thermostatically controlled switch 148. If the temperature in the cabinet should exceed a predetermined value, relay 147 will be automatically operated to open the circuit to the cabinet heater.

A master switch 150 is electrically connected to the lead 124 by means of a switch 152 and a switch 154. The other side of the master switch is connected by a lead 156 to the electronic controller 160, such as marketed by the West Instrument Co. and which is provided to control the operation of the heater 40. A switch 162 is provided in line 156 to actuate the heater 40. The controller of the type marketed by West Instrument Corporation includes a manually operated pointer arm which may be positioned at any desired temperature set point, and a voltmeter pointer or arm movable in response to a signal generated by the coil 90 as a result of movement of core 92 carried on the end of scale beam 76. The controller also includes a small light source and photocell disposed so that the light is directed onto the cell. An opaque flag or disc is carried on the voltmeter pointed and disposed to block any light beam striking the photocell when the pointer is in alignment which the set point arm. As long as the light strikes the photocell sufficient current is generated in the photocell to actuate the driver chassis 166 which includes a magnetic amplifier for supplying electrical power to saturable reactor 120 wired in series with heater 40. The reactor 120 will vary the power supplied to the heater in response to the output signal of the controller 160 as when the opaque flag carried on the arm of the voltmeter, interrupts the light beam path to the photocell. When the pre-expanded beads reach a predetermined density a signal is generated in coil 90, and the movable pointer of the controller would come into registration with the set point arm whereby the power supplied to heater 40 is reduced.

As herein disclosed, the pre-heaters 19 are controlled in the same manner as the heater 40 with the exception that a thermocouple is employed instead of coil 90. The thermocouple 180, disposed in conduit 10, generates a minute electrical current, which varies in proportion to the temperature of the thermocouple. This current causes deflection of the voltmeter pointer of controller 163, and the output signal of the controller is connected to drive chassis 184 which may be identical to chassis 166. Thus the saturable reactor 122 wired in series with heaters 19 will vary the power supplied to the heaters in relation to the light being blocked from a photocell by the pointer flag in the electronic controller 163. Lead 158 also extends from the switch 150 and is connected to another electronic controller 163 similar to the controller 160. The controller 163 is provided for controlling the operation of the pre-heaters 119 (FIG. 1). A switch 164 is provided in line 158 to actuate the pre-heaters.

The air heater 40 is automatically controlled as a function of the density of the beads carried by the conveyor 60 in the following manner. An electronic unit such as a driver chassis 166 marketed by West Instrument Co. is connected to the electronic controller 160 by means of a cable 168. Another lead to the controller 166 is through a relay 170 operated by a thermostatically controlled switch 172 which operates to cut off the heater 40 if the temperature of the air coming from the heater 40 exceeds a pre-set value. A green indicator lamp 171 is provided to show the operator whether or not the controller 160 is energized. A red indicator lamp 174 is provided to indicate when the unit 166 is de-energized. The unit 166 is electrically connected to the saturable reactor 120 which, as mentioned above, controls the operation of the heater 40 in accordance with a signal generated by the coil 90.

As shown, the coil 90 is connected to a Taylor Recorder 176 from which a signal is transmitted to the controller 160. In accordance with the signal developed in the coil, the temperature of the heater 40 is proportionally adjusted to bring the beads to the pre-set density. Moreover, as the density approaches the pre-set value, the heater 28 is continuously and automatically adjusted so that the density will not vary or "hunt" about the pre-set value.

The pre-heaters 19 are controlled by the electronic control unit 163, as hereinbefore described, which is responsive to a signal from thermocouple 180 located on the conduit 10 (FIG. 1). A cable 182 electrically interconnects the controller 163 to a driver chassis 184 which, in turn, supplies an electrical signal to the saturable reactor 122 connected as previously described to the pre-heaters 19. With this arrangement, a heat balance is maintained, since the temperature of the pre-heaters is adjusted in proportion to the temperature deviation from a pre-set value detected by the thermocouple 180.

The fan 28 is driven by a motor 186, controlled by a relay 188 in series with the switch 152. The relay circuit 188 is electrically interconnected to the drive chassis 184 by means of a lead 189. An indicator lamp 190 is provided across the relay as shown when the fan 28 is energized.

The pre-heat motor 21 which drives the conveyor screw 18 is controlled by the switch 154. An indicator lamp 191 provides visual indication of the operating condition of the pre-heat motor. A cut-out 192, operated by a photocell, is provided in the circuit of the pre-heat motor 21 to de-energize the motor if the level of the beads on the conveyor 60 exceeds the pre-set height of the doctor bar 74. Switch 194 controls the operation of the motor 63 which drives the conveyor belt 60. A cut-out 196 operated by a photocell is provided in series with the conveyor belt motor 63 for stopping the conveyor belt whenever the level of the beads being carried on the belt is below the pre-set height of the doctor bar. The cut-out 196 is also electrically connected similarly to de-energize the pre-heater motor 21. Another cut-out 198, photocell operated, serves to cut off the pre-heater motor 21 whenever the height of the beads in the storage tank 16 exceeds a predetermined level.

A switch 200 is connected to a step-up transformer 202 which increases the voltage from 115 to approximately 24,000 volts. This high voltage is electrically connected across static bars 47 and 99 which, as described above, serve to neutralize any electrical charge carried by the plastic particles.

Means is provided to monitor the temperature within the expansion unit 12. As shown, this is accomplished by means of thermocouple 203 of the type marketed by the West Instrument Co.

The interior of the control unit may be provided with suitable illumination. As shown, a cabinet lamp 204 is disposed within the unit and its operation is indicated by a lamp 206 which may be green in color and controlled by switch 207.

The motor 102 which drives the stirrer in the storage tank may be operated by an "on-off" switch 208. Energization of the motor may be indicated by a green lamp 210. The vibrator 59 and its indicator lamp 212 are operated by means of a switch 214.

In summary of the operation, polymeric beads are fed from the hopper 26 into the pre-heat chamber 10 where they are heated uniformly to a temperature somewhat below that of the actual softening point of the plastic. The material is then introduced into a high velocity air current and carried into the air flow unit 26. The air is essentially dry and heated above the softening point of the polymeric material. In the annular chamber 44 the particles are pneumatically agitated and circulated, deriving heat from the air in which they are entrained. The particles remain in the annular chamber until their bulk density is reduced to about 3 to 4 lbs. per cubic foot. At this density the particles are individually carried upwardly from the horizontal annular chamber 44 into the upright vent or stack 46. In the stack, the particles are suspended on the rising column of heated air. The particles remain in the stack until the desired volume-to-mass weight ratio is achieved, at which point they are carried out of the stack into the outer casing 24 which is at a lower temperature than the air stream. The path of air flow is deflected by plate 38 and the particles freely fall into the control unit 14.

The control unit 14 senses the bulk volume of the entire output of the system and generates a signal which regulates the temperature of the air heater. Since the velocity of air rising in the stack 46 is a function of its temperature if the weight of a known volume of material is lower than the desired value, the control system increases the amount of heat being supplied by the heater 40. This raises the velocity of air rising in the stack and material of higher density will be carried out of the system. If the weight of the known volume of material is greater than the desired value, the air temperature will be reduced and its velocity correspondingly decreased, thus lower density material will be carried from the system.

It has been found that the density control system is capable of controlling the density of the particles within extremely close tolerances. Moreover, the material can be molded immediately without delay for drying, thus facilitating handling and storage.

While the above description has in large measure been concerned with the expansion of polymeric beads, this invention also relates to the complete expansion of polymeric particles regardless of their configuration and utility. Thus, for example, it has been found that the dry expansion of polystyrene strands which may be used as loose packaging fill has advantages of convenience, simplicity and speed. Moreover, installation of apparatus for carrying out the dry expansion process requires no plumbing and drain connections. For such utility, it will be realized that the degree of accuracy of density control desirable for bead pre-expansion is not necessary for the complete expansion of polystyrene strands.

Having thus described this invention, what is claimed is:

1. Apparatus for partially expanding foamable thermoplastic particles to a predetermined bulk density comprising means for continuously conveying said particles along a predetermined path, means extending over a portion of said path for supporting said particles in a stream of heated air to expand said particles, the expansion of said particles being responsive to a time-temperature relationship, means for measuring the bulk density of the expanded particles as they are moved along said path, and means responsive to said bulk density measuring means for controlling the velocity of said air stream to achieve said predetermined bulk density.

2. Apparatus for expanding foamable thermoplastic particles to a predetermined bulk density comprising an air chamber open at its upper end, means for impelling air into the chamber at its lower end, means for providing a heated upward air current in said chamber having a velocity sufficient to support said thermoplastic particles in air borne suspension, said air being heated above the expansion temperature of said thermoplastic particles to supply heat of expansion to said particles, means for separating particles from the air current when expanded to said predetermined density, means for determining the density of the particles so separated from the air current, and means responsive to the density determining means for controlling the upward air current velocity in the chamber to automatically maintain the particle output of said apparatus at said predetermined bulk density.

3. Apparatus as set forth in claim 2 in which the means for controlling the velocity of the air current includes means for controlling the temperature of said air to maintain the expanding particles at said predetermined density.

4. Apparatus for expanding foamable plastic particles comprising an annular chamber disposed about a generally upright axis, an upright stack coaxial with said annular chamber and communicating with the inner radial portion thereof, a casing disposed around said chamber and stack having its inner surface radially spaced outwardly thereof, means for supplying a heated current of air into said annular chamber, a conduit opening through said casing opposite the upper end of said stack, said conduit communicating with said air supply means, means for introducing thermoplastic particles into said air stream, said air stream having sufficient velocity to carry and maintain said particles in air suspension, said air being heated to a temperature above the expansion point of said particles, said velocity and temperature being sufficient to carry particles expanded to said predetermined density out of said stack, means for laterally deflecting the air flow emanating from said stack sufficiently to extract the particles therefrom, said casing having a bottom opening for discharging the expanded particles, and a conveyor-scale for continuously determining the density of the expanded particles.

5. Apparatus as set forth in claim 4 including means for automatically and continuously adjusting the velocity of the air in said annular chamber and stack proportional to deviation of particle density determined by said conveyor-scale relative to said predetermined density.

References Cited by the Examiner

UNITED STATES PATENTS

| | | | |
|---|---|---|---|
| 748,893 | 1/1904 | Trump | 34—57 |
| 1,475,502 | 11/1923 | Manning | 34—10 |
| 1,550,992 | 8/1925 | Trump | 34—10 |
| 1,635,527 | 7/1927 | Barthelmess. | |
| 1,777,670 | 10/1930 | Hausman. | |
| 2,054,441 | 9/1936 | Peebles | 159—4 |
| 2,561,394 | 7/1951 | Marshall | 159—4 X |
| 2,561,395 | 7/1951 | Marshall | 159—4 |
| 2,571,143 | 10/1951 | Leslie | 34—182 |
| 2,636,284 | 4/1953 | Napier | 34—182 |
| 2,664,286 | 12/1953 | Frazel | 177—16 |
| 2,950,261 | 8/1960 | Buchhotz et al. | 260—2.5 |
| 2,983,692 | 5/1961 | D'Alelio | 260—2.5 |

WILLIAM F. O'DEA, *Primary Examiner.*

LEON J. BERCOVITZ, PERCY L. PATRICK, JOHN J. CAMBY, *Examiners.*

M. FOELAK, J. SOFER, *Assistant Examiners.*